United States Patent
Han

(10) Patent No.: US 11,747,133 B2
(45) Date of Patent: Sep. 5, 2023

(54) DEMODULATION OF FIBER OPTIC INTERFEROMETRIC SENSORS

(71) Applicant: Board of Trustees of Michigan State University, East Lansing, MI (US)

(72) Inventor: Ming Han, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 90 days.

(21) Appl. No.: 17/237,438

(22) Filed: Apr. 22, 2021

(65) Prior Publication Data

US 2021/0333089 A1   Oct. 28, 2021

Related U.S. Application Data

(60) Provisional application No. 63/016,319, filed on Apr. 28, 2020.

(51) Int. Cl.
*G01D 5/353* (2006.01)
*G01B 9/02015* (2022.01)
(Continued)

(52) U.S. Cl.
CPC ..... *G01B 9/02028* (2013.01); *G01B 9/02003* (2013.01); *G01D 5/35316* (2013.01); *G02B 6/29347* (2013.01); *G01B 2290/70* (2013.01)

(58) Field of Classification Search
CPC ............ G01B 9/02028; G01B 9/02003; G01B 2290/70; G01D 5/35316; G01D 5/35322;
(Continued)

(56) References Cited

U.S. PATENT DOCUMENTS 4,360,272 A    11/1982   Schmadel et al.
5,227,857 A *   7/1993   Kersey ................. G01B 9/0207
                                                         250/227.27
(Continued)

OTHER PUBLICATIONS

Read, I., et al., "Optical fibre acoustic emission sensor for damage detection in carbon fibre composite structures," Measurement Science and Technology 13, N5 (2001).
(Continued)

*Primary Examiner* — Jonathan M Hansen
(74) *Attorney, Agent, or Firm* — Harness, Dickey & Pierce PLC

(57) ABSTRACT

A system and method for demodulation of a fiber optic interferometric sensor are provided. Another aspect pertains to a system and method employing a single laser to generate multiple quadratic wavelengths to demodulate fiber optic interferometric sensors with approximately sinusoidal fringes. Yet another aspect of the present system and method uses a single frequency laser which is split into multiple paths using a fiber optic coupler, with one path including an intensity modulator and another path including an acousto-optic modulator, whereafter the paths are recombined into a fiber which leads to an interferometric sensor, and the light reflected from the sensor is then directed to a photodetector. A further aspect employs a single frequency laser which is split into multiple paths, with the light in the paths being modulated at different frequencies, whereafter the paths are recombined into a fiber which leads to an interferometric sensor.

24 Claims, 13 Drawing Sheets

(51) Int. Cl.
*G01B 9/02003* (2022.01)
*G02B 6/293* (2006.01)

(58) Field of Classification Search
CPC ........... G01D 5/35325; G01D 5/35312; G02B 6/29347
See application file for complete search history.

(56) References Cited

U.S. PATENT DOCUMENTS

| | | | |
|---|---|---|---|
| 5,313,266 A | 5/1994 | Keolian et al. | |
| 6,335,524 B1 | 1/2002 | Udd et al. | |
| 6,512,627 B1 | 1/2003 | Kim et al. | |
| 6,876,786 B2 | 4/2005 | Chliaguine et al. | |
| 7,561,276 B2 | 7/2009 | Boyd | |
| 8,665,447 B2 | 3/2014 | Levy et al. | |
| 10,247,581 B2 | 4/2019 | Ronnekleiv et al. | |
| 10,416,005 B2* | 9/2019 | Moore | G01B 9/02067 |
| 2007/0127932 A1* | 6/2007 | Qi | H04B 10/548 |
| | | | 398/188 |
| 2007/0165238 A1 | 7/2007 | Boyd | |
| 2012/0278043 A1* | 11/2012 | Lewis | G01D 5/35396 |
| | | | 702/189 |
| 2014/0010530 A1* | 1/2014 | Goebuchi | H04J 14/06 |
| | | | 398/79 |
| 2017/0138785 A1* | 5/2017 | Tadakuma | G01V 1/226 |

OTHER PUBLICATIONS

Dong, B., et al., "Two-wavelength quadrature multipoint detection of partial discharge in power transformers using fiber Fabry-Perot acoustic sensors," in Fiber Optic Sensors and Applications IX, International Society for Optics and Photonics, (2012), p. 83700K.

Liao, H., et al., "Phase demodulation of short-cavity Fabry-Perot interferometric acoustic sensors with two wavelengths," IEEE Photonics Journal 9, 1-9 (2017).

Lee, B., et al., "Interferometric Fiber Optic Sensors," Sensors (2012), 12, p. 2467-2486.

Wang, L. et al., "Applications of Fiber-Optic Interferometry Technology in Sensor Fields," Chapter 7 (Jun. 2, 2016).

Wada, A., et al., "Enhancement of Dynamic Range of Optical Fiber Sensor Using Fiber Bragg Grating Fabry-Pérot Interferometer with Pulse-Position Modulation Scheme: Compensation of Source Wavelength-Sweep Nonlinearity," IEEE (Aug. 2013).

Liu, K., et al. "Signal Processing Techniques for Interferometric Fiber-Optic Strain Sensors," Research Article (Jul. 1, 1992).

* cited by examiner

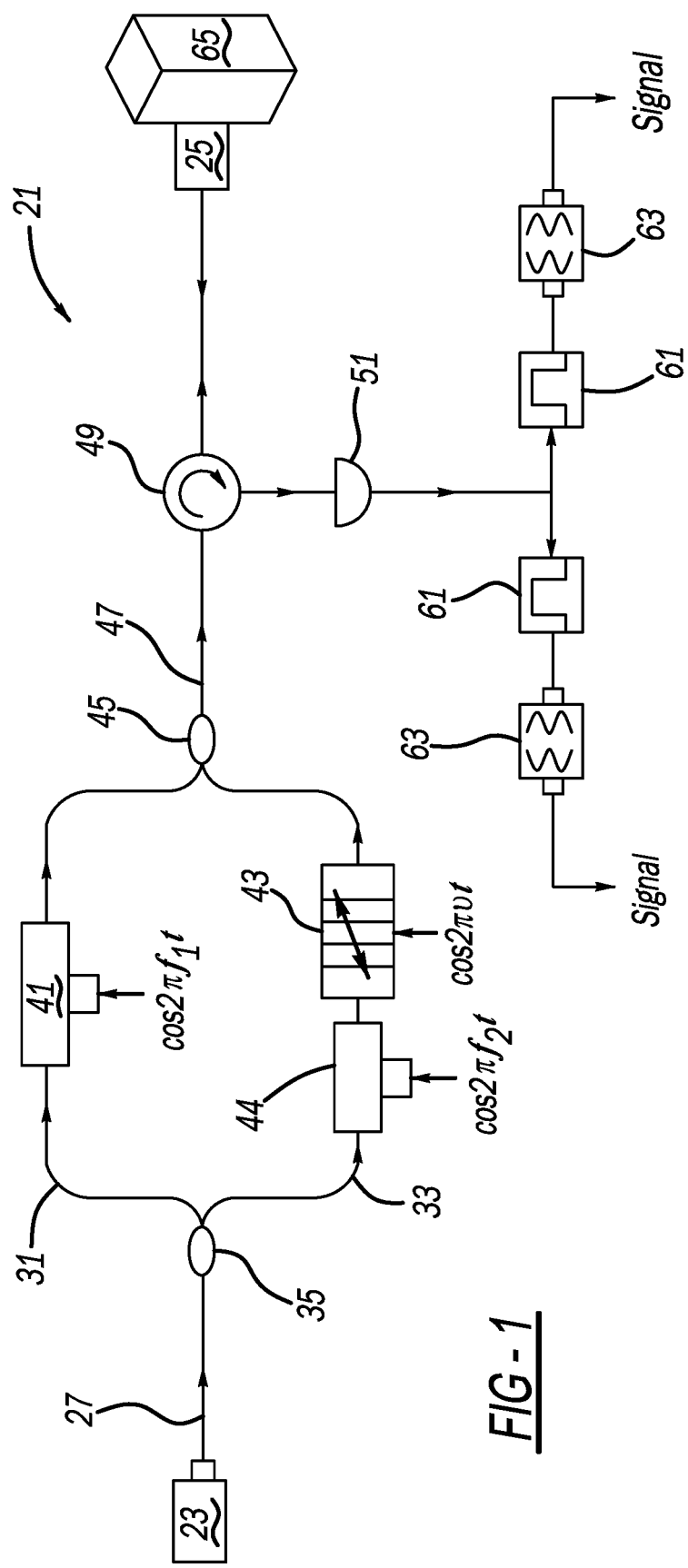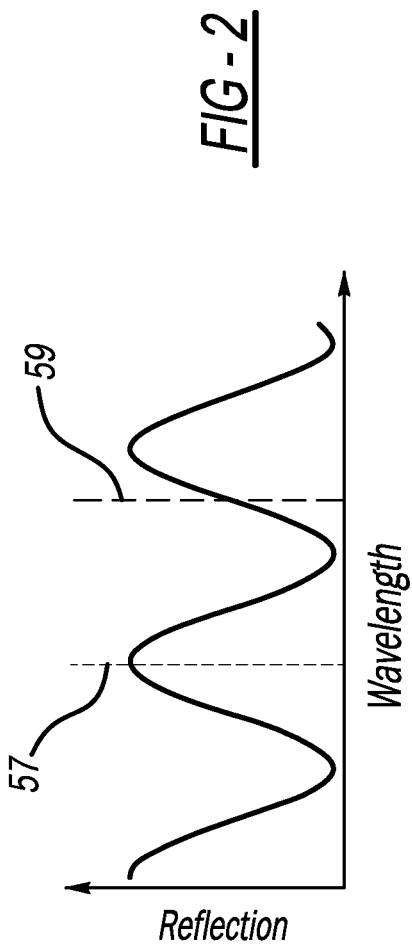
*FIG-1*
*FIG-2*

DEMODULATION OF FIBER OPTIC INTERFEROMETRIC SENSORS

CROSS-REFERENCE TO RELATED APPLICATIONS

The present application claims priority to U.S. provisional patent application Ser. No. 63/016,319 filed on Apr. 28, 2020, which is incorporated by reference herein.

GOVERNMENT SUPPORT CLAUSE

This invention was made with government support under N00014-18-1-2273 and N00014-18-1-2597 awarded by the Office of Naval Research. The government has certain rights in the invention.

BACKGROUND

The present application relates generally to a demodulation system and more particularly to a system that demodulates a fiber optic interferometric sensor.

Fiber optic interferometers that sense temperature, strain, pressure and refractive index, are known. Such interferometers are of four general types: Fabry-Perot, Mach-Zehnder, Michelson and Sagnac sensors. The traditional construction and use of these sensors are discussed in Byeong Ha Lee, et al., "Interferometric Fiber Optic Sensors," Sensors 12(3), ISSN 1424-8220, 2467-2486 (Feb. 23, 2012).

The interference of optical fields generates fringes in a reflection or transmission spectrum of conventional interferometers which is dependent on an optical-path length difference ("OPLD") of the interferometer. A change of parameters modifies the OPLD and causes a spectral shift or a phase change of the fringes. As a result, the change of the parameters can be measured by the spectral shift or the phase change of the fringes.

A common traditional method to sense the spectral shift in fiber optic sensor systems is to use a single-frequency laser for sensor demodulation. In this known method, power of the laser reflected from the sensor is measured by a photodetector ("PD") and a wavelength is set at a point on a spectral slope of the fringes. A spectral shift leads to variations of the reflected optical power of the laser, which are measured by the PD. This so-called "intensity demodulation" has theoretical advantages of low cost and high speed. In practice, however, a wavelength drift or environmental perturbations may undesirably move the operation point to a region with significantly reduced slope on the spectrum. Locking the laser wavelength to the spectral slope by a feedback control system has been attempted to solve this concern but the requirement on the laser wavelength tuning range and tuning speed make this approach difficult to implement in many cases.

For two-beam interferometers or low-finesse Fabry-Perot interferometers, the spectral fringes can be approximated as a sinusoidal function. In this case, a possible method is to use two lasers whose wavelengths are separated by a value corresponding to a quadrature phase difference of $2$ m$\pi \pm \pi/2$ of the fringes, where m is an integer, at the two wavelength positions of the fringes. This possible solution has the advantage that no laser wavelength tuning is needed. However, as the wavelengths of the two lasers can drift independently (for example, due to temperature variations or mechanical perturbations), it is likely to be a challenge to maintain the relative wavelength separation between the lasers.

For interferometric sensors with sinusoidal fringes, the phase change and consequently the measurements can be obtained by a homodyne demodulation scheme using a phase-generated carrier. This is disclosed in Dandridge, et al. "Homodyne demodulation scheme for fiber optic sensors using phase generated carrier," IEEE Transactions on Microwave Theory and Techniques, vol. 30, no. 10, at 1635-1641 (1982). This conventional method, however, may lack the sensitivity for detection of small signals. It requires either a tunable laser or the capability to modulate the interferometer such that the highest frequency of the signal that can be demonstrated is limited to half of the fundamental carrier frequency.

SUMMARY

In accordance with the present invention, a system and method for demodulation of a fiber optic interferometric sensor are provided. Another aspect pertains to a system and method employing a single laser to generate multiple quadratic wavelengths to demodulate fiber optic interferometric sensors with approximately sinusoidal fringes. Yet another aspect of the present system and method uses a single frequency laser which is split into multiple paths using a fiber optic coupler, with one path including an intensity modulator and another path including an acousto-optic modulator, whereafter the paths are recombined into a fiber which leads to an interferometric sensor, and the light reflected from the sensor is then directed to a photodetector. The light that goes to the sensor includes two laser lines whose difference is equal to the amount of frequency shift, such that the sensor will provide a relatively sensitive response to the spectral shift. A further aspect employs a single frequency laser which is split into multiple paths, with the light in the paths being modulated at different frequencies, whereafter the paths are recombined into a fiber which leads to an interferometric sensor.

In another aspect, the present apparatus includes a single laser and an optical frequency shifter (in one example, achieved by an acousto-optic modulator) to generate two laser wavelengths at quadrature positions of fringes of interferometric sensors for demodulation. Still another aspect includes separating two laser beam wavelengths and obtaining signals from two quadrature channels through intensity modulation of one or both channels, electronic filters, and envelop detectors. In another aspect, the system and method separate two laser beam channels using a three-port AOM and time-division multiplexing/demultiplexing. Furthermore, an aspect employs any of the preceding approaches in a multiplexed sensor system where only one frequency shifter (in one example, an AOM) is shared by multiple sensors.

The present system and method are advantageous over prior constructions. For example, the present system and method allow for accurate ultrasound detection even when the spectrum of the sensor experiences large environmental drifts, such as due to temperature variations in the workpiece. The present system and method do not exhibit traditional signal fading, and extreme low ultrasonic frequency sensitivities. Moreover, the present system and method do not need multiple lasers for a sensor and do not require wavelength-tuning capability from the laser. Additional advantages and features of the present invention can be ascertained from the following description and appended claims, taken in conjunction with the accompanying drawings.

BRIEF DESCRIPTION OF THE FIGURES

FIG. 1 is a circuit diagram showing a first embodiment of the present system;

FIG. 2 is a graph for the first embodiment of the present system;

DETAILED DESCRIPTION

Figure 3:
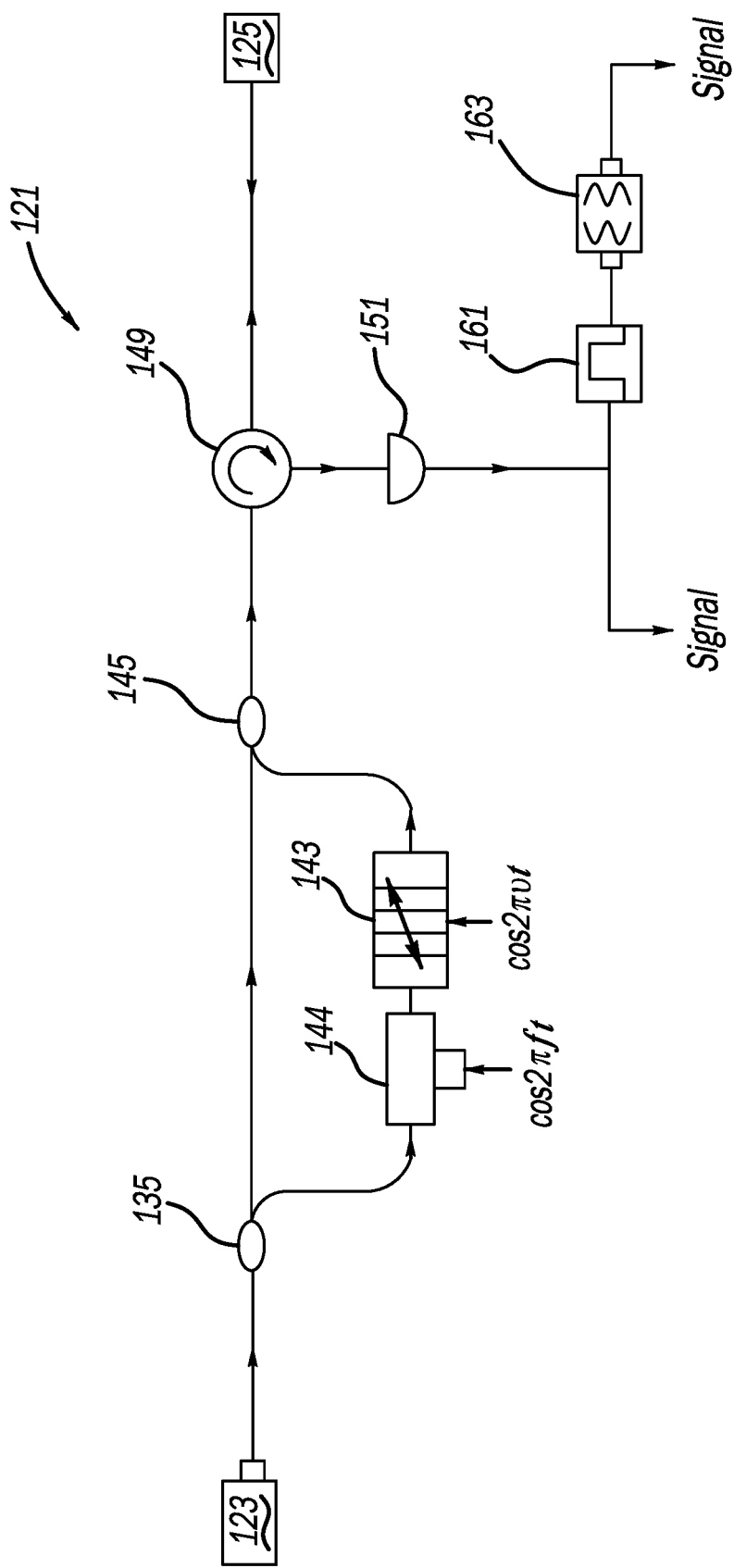
FIG. 3 is a circuit diagram showing a second embodiment of the present system.

The present system and method demodulate fiber optic interferometric sensors. Such sensors are placed against a workpiece, such as an aircraft wing component, infrastructure bridges, power transmission structures, pipelines, and the like. The sensors are ideally suited for sensing ultrasonic acoustic signals to determine if any cracks or other undesirable structural characteristics are present in the workpiece adjacent to the sensor.

An exemplary sensor employed in the present system is a two-beam fiber-optic interferometer, more specifically a fiber Mach-Zehnder interferometer. A Mach-Zehnder interferometer generally has multiple optical paths or fiber arms, a first being a signal arm and a second being a reference arm. The light beam from a laser light source is amplitude-divided by a fiber coupler into two laser beams propagating in the arms. The signal arm senses disturbances in an external environment and the reference arm is maintained in a relatively constant environment. A signal phase is changed by the disturbances when the laser beam travels through the signal arm, thereby producing a phase difference between the two split beams, which are thereafter recombined by a second fiber coupler. Two groups of output beams are then detected by photodetectors, and converted into a pair of fringe signals in anti-phase, as will be discussed in greater detail hereinafter.

Another exemplary sensor for use in the present system is a fiber Michelson interferometer, which is also a two-beam optical interferometer. For this sensor, signal and reference paths or arms are terminated by two Faraday rotator mirrors. Accordingly, a signal laser beam and a reference laser beam are reflected by associated mirrors back to a coupler where they are recombined to generate an interference signal.

A fiber Sagnac interferometer is another exemplary sensor usable with the present system. A Sagnac sensor is a two-beam, common-path interferometer in which two laser beams from the coupler pass along the same fiber loop but in opposite directions. An interference fringe is generated when the opposite beams recombine at the optical coupler. This is well suited for sensing current, voltage, electric and magnetic fields.

Moreover, another exemplary sensor that can be used in the present system is a Fabry-Perot interferometer. This sensor is a multiple-beam interferometer having an interferometric cavity formed by two reflectors or partial mirrors, on either side of an optically transparent medium. In an extrinsic-type structure, an air gap, or a solid or liquid material, separates the two reflectors. The intrinsic version employs a cavity as an integral part of a continuous fiber with two internal reflectors formed by Fesnell reflections from flat-cut fiber ends, connections of different fibers, or by fiber Bragg gratings. An interference fringe, caused by multiple reflections of the laser beam in the cavity, is much narrower than the two-beam fringes of the other exemplary sensors, and sharpens when reflectance is increased.

The application of the exemplary fiber Fabry-Perot interferometer within the present system will now be discussed. The sensor is mounted on the surface of a metal or composite structure to monitor the acoustic emission for health monitoring of the structure. Many of damage-related structural changes, such as crack initiation, crack growth, or fiber breakage, can generate acoustic emission, ultrasonic waves that travel along the structure. As the ultrasound travels to the sensor, the fiber in the sensor region is stretched and compressed according to the ultrasonic wave, which changes the OPLD of the interferometer and thereby shifts the spectral fringes. The ultrasonic waves may be evaluated by detecting the spectral shift of the fringes of the sensor.

Reference should now be made to FIG. 1 to understand the specific construction of the present demodulation system 21 and method. It is noteworthy that the present system and method use a single laser 23 but generate two quadratic wavelengths for the demodulation of a fiber-optic interferometric sensor 25 with approximately sinusoidal fringes.

Single-frequency laser 23 emits a beam of laser light 27 which is split into two fiber optic paths or arms 31 and 33 using a fiber-optic coupler 35. Laser 23 has a narrow linewidth or low frequency noise. Upper arm 31 includes an intensity modulator ("IM") 41 and lower arm 33 includes another IM 44, which provides intensity modulation to the laser beam on that arm, and a frequency shifter 43, which shifts the laser beam frequency by an amount of 10 s to 100 s MHz. It should be noted for this embodiment that $\cos 2\pi f_1 t$ and $\cos 2\pi f_2 t$ are the signals for intensity modulation while $\cos 2\pi v t$ is the signal for optical frequency shifting; assuming the frequency of the laser is $v_0$, after the frequency shifter, the frequency of the laser will be shifted to $v_0 + v$ or $v_0 - v$. It should also be noted that, in some applications, the IM and the frequency shifter on the lower arm can be replaced by a single acousto-optic modulator ("AOM") that can provide both the laser intensity modulation and laser frequency shifting. Then the laser light beams in the two paths are recombined by a coupler 45 into a fiber 47 and is transmitted to interferometric sensor 25 through a fiber-optic circulator 49. It should be noted that a fiber coupler could also be used in place of fiber-optic circulator 49.

The light reflected from sensor 25 is then directed to a PD 51 whose output is an electric signal proportional to the overall power of the light. The laser beam light that travels to the sensor consists of two laser lines whose difference is equal to the amount of frequency shift due to the frequency shifter. By designing the sensors and/or tuning the amount of frequency shift, two wavelengths can be placed at quadrature points on the sinusoidal fringes. An example of two laser lines on two quadrature points of the fringes is shown in FIG. 2. This is designated as an original laser line 57 and a frequency shifted laser line 59. Therefore, sensor 25 will give a relatively sensitive response to the spectral shift through at least one of the laser lines.

To separate the two signals corresponding to the two laser lines 57 and 59, the light in the two arms 31 and 33 is modulated at two different frequencies, $f_1$ and $f_2$, both of which are much higher than the upper limit of the signal frequency. The modulated signal is separated in the frequency domain using two bandpass filters ("BPF"s) 61 centered at $f_1$ and $f_2$. The variations of the reflected power detected by each laser line is then proportional to the envelope of the modulated light power and can be detected by an envelope detector 63. Sensor 25 is shown against a workpiece 65.

A second embodiment of the present system 121 is illustrated in FIG. 3. An intensity modulator as well as an associated BPF and an associated envelope detector are removed from one of the arms in this configuration. Here, a single frequency laser 123, couplers 135 and 145, an IM 144 and a frequency shifter 143 are employed. Also, an interferometric sensor 125 and a PD 151 are used. The two laser lines are placed on two quadrature points of the sensor fringes. The coupling ratios of couplers 135 and 145 are selected so that the power of the original laser line is much larger than that of the frequency shifted line in the fiber after they are rejoined by coupler 145. The laser beam light output from the PD passes to only a single BPF 161 and a single envelope detector 163 with this construction. Accordingly, the PD output is a simperpostion of the signal from the frequency-shifted laser line and a signal from the original laser line. Furthermore, the power in the original laser line is significantly larger than that in the frequency-shifted laser line such that the negative interference from the frequency-shifted line onto the original laser line will be insignificant.

Figure 4:
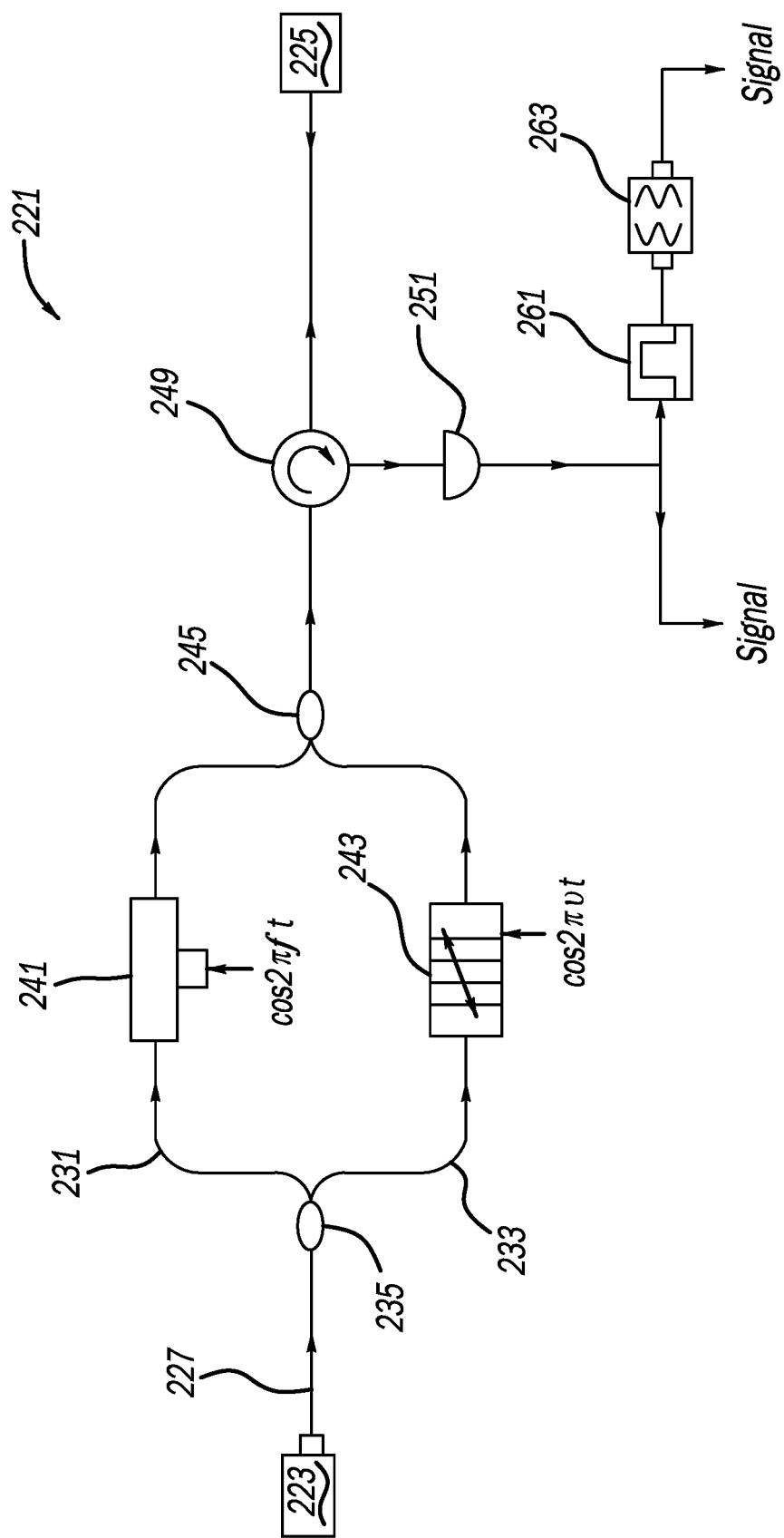
FIG. 4 is a circuit diagram showing a third embodiment of the present system.

A third embodiment of the present system 221 can be observed in FIG. 4. A single frequency laser 223 emits a laser beam light through a fiber 227 to a first coupler which splits the light into an upper fiber path 231 associated with an IM 241 and a lower fiber path 233 associated with a frequency shifter 243. The intensity modulated and frequency shifted beams are rejoined by a second coupler 245 and transmitted to an interferometric sensor 225. The two laser lines are placed on two quadrature points of the sensor fringes. A circulator 249 then sends the reflected light signal to a PD 251 and then onto a BPF 261 and envelope detector 263 via only a single signal arm thereafter. The coupling ratios of couplers 235 and 245 are selected so that the power of the frequency-shifted laser line is much larger than that of the original line in the fiber after they are rejoined by coupler 245.

Figure 5:
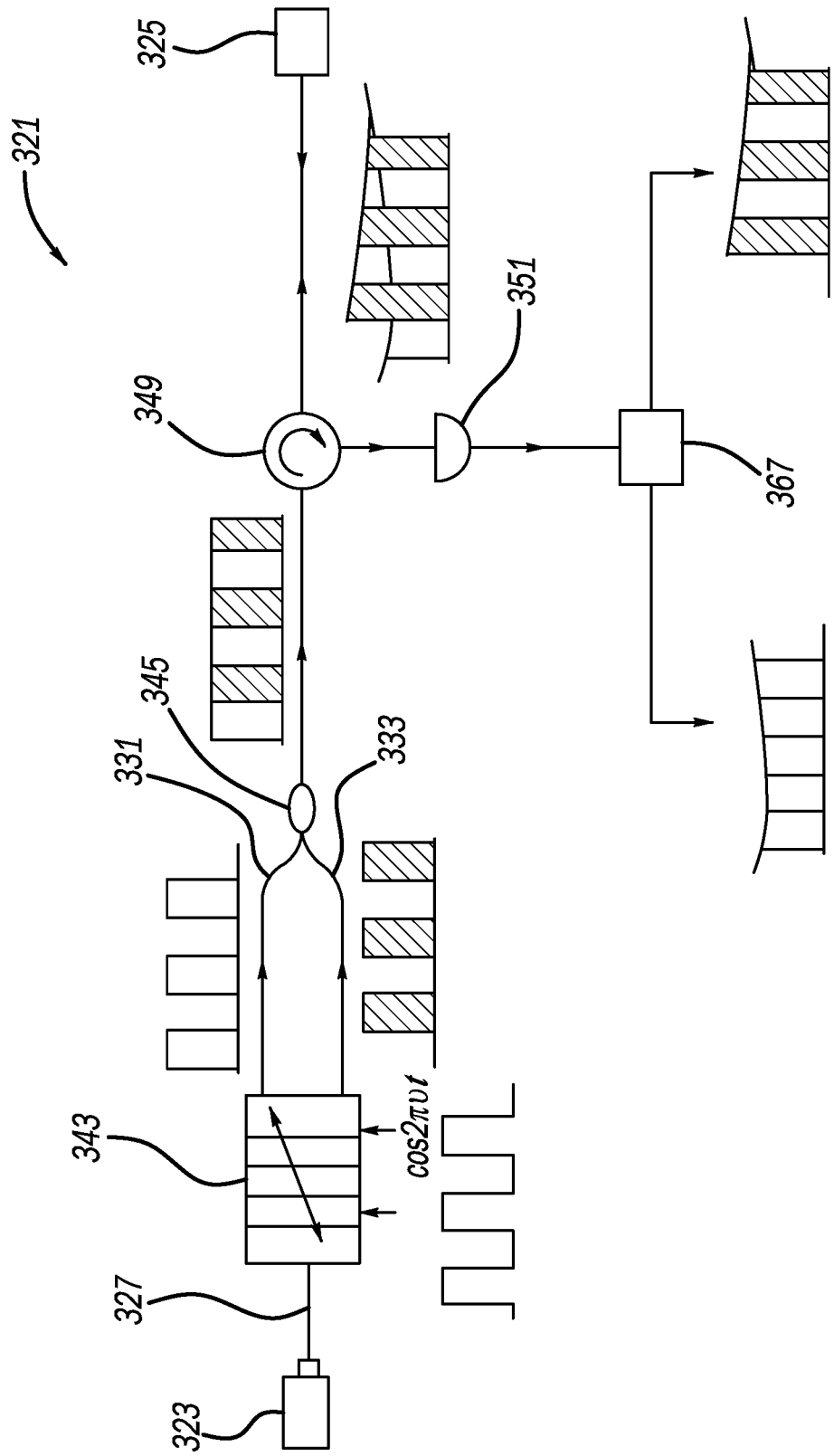
FIG. 5 is a circuit diagram showing a fourth embodiment of the present system.

A fourth embodiment of the present system 321 is shown in FIG. 5. A single frequency laser 323 emits a laser beam through a fiber 327 directly to a three-port AOM 343 with one input port and two output ports being used. One of the two output ports contains the frequency up-shifted line or fiber optic path 331, and the other contains the frequency down-shifted line or fiber optic path 333. The two laser lines are at quadrature positions of fringes of the interferometric sensor. When a driving signal is used to modulate the laser power, the power in both output ports will be modulated while the sum of the power in the two ports is a constant. In this case, the light is modulated into approximately square waves and the signals from the two laser lines can be separated in the time domain. A coupler 345, an interferometric sensor 325, a circulator 349, a PD 351 and a demultiplexer 367 are also coupled to the system.

Figure 6:
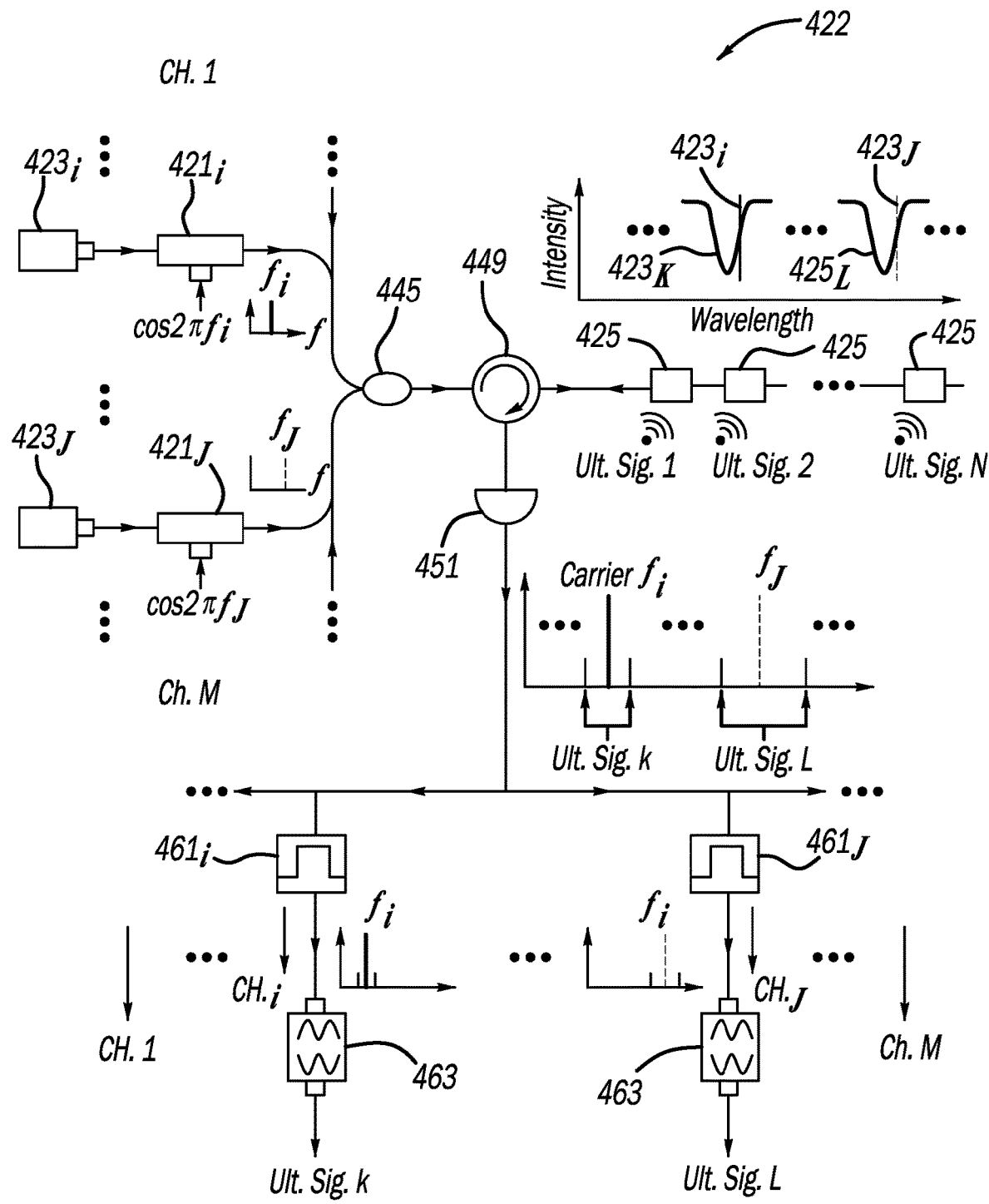
FIG. 6 is a circuit diagram showing a fifth embodiment of the present system.

As shown in FIG. 6, a fifth embodiment of the present system 422 includes multiplexing fiber-optic, ultrasound sensors using laser intensity modulation, and more particularly using laser intensity modulation and for multiplexing and demultiplexing of fiber Bragg grating ("FBG")-based ultrasound sensors 425. An intensity modulator 441 modulates output power of a laser 423 with a frequency much higher than that of the ultrasounds. The high-frequency modulated optical signal serves as a carrier signal where ultrasonic signals impinged onto interferometric sensor 425 appear as an envelope of the carrier signal. In the frequency domain, the carrier signal and the sideband with the ultrasonic signal are separated from those of other channels and thus, can be isolated using an electronic bandpass filter 461 for cross-talk-free ultrasound detection. Each laser can be tuned to demodulate any sensor covered by the wavelength range of the laser and a common photodetector is used for all channels.

A large number of redundant sensors 425 are incorporated in a sensor network. This redundant approach can help accommodate future inspection needs as the platform ages and/or new hot spots appear with more stringent monitoring demands. To reduce cost, it may not be necessary to interrogate all the sensors at the same time, which is achieved by using time division multiplexing. To overcome expense and complexity of prior attempts, the present system employs intensity-modulated lasers (without modulating the wavelengths of the lasers) for multiplexing FBG based ultrasonic sensors. Each laser 423 is tuned to demodulate any sensor 425 in the wavelength range of the laser and a common photodetector 451 is used for all channels. Advantageously, the wavelengths of the sensors in the present system can be anywhere within the wavelength range of the lasers, as long as they do not overlap.

There are a total of M channels, each containing wavelength-tunable laser 423 and IM 421, to interrogate a total of N sensors 425 (usually N>M). A wavelength of each laser can be configured to pair with any of the sensors within its wavelength range. The modulated optical signals from all channels are combined by a 1×M coupler 445. The IMs 421 are driven by sinusoidal functions with different frequencies much higher than the frequencies of the ultrasonic signals ("Ult. Sig.") under measurement. The combined optical signals are directed to sensors 425 via a circulator 449. The total returned optical signal is received by common PD 451. Output of the PD is thus composed of all the carrier signals along with the concomitant ultrasonic signals, which are separated in the frequency domain. The carrier and ultrasonic signals are then separated by electronic bandpass filters 461, whereby each BPF lets one carrier and the concomitant ultrasonic signals go through. Using an envelope detector 463, the ultrasonic signal is then extracted separately for each channel. When all the channels work simultaneously, a maximum of M ultrasonic signals can be obtained at the same time.

Figure 7A:
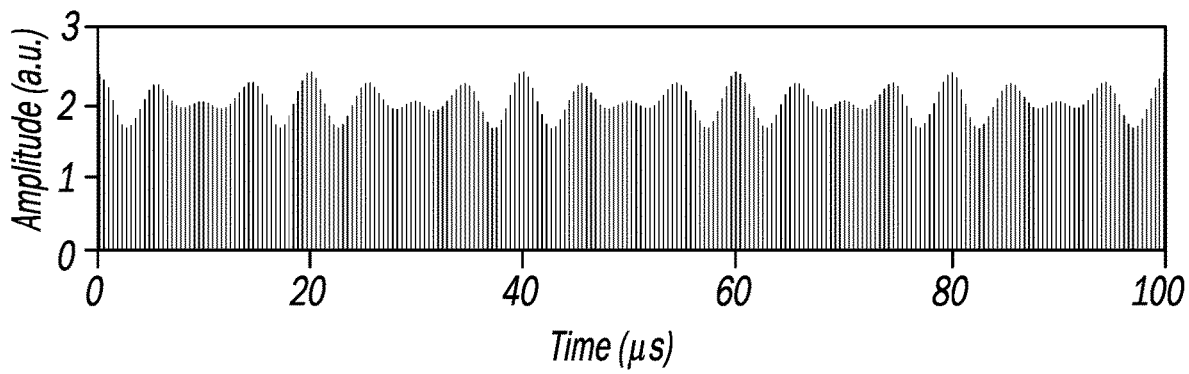
FIGS. 7A-G are graphs for the fifth embodiment of the present system.
Figure 7B:
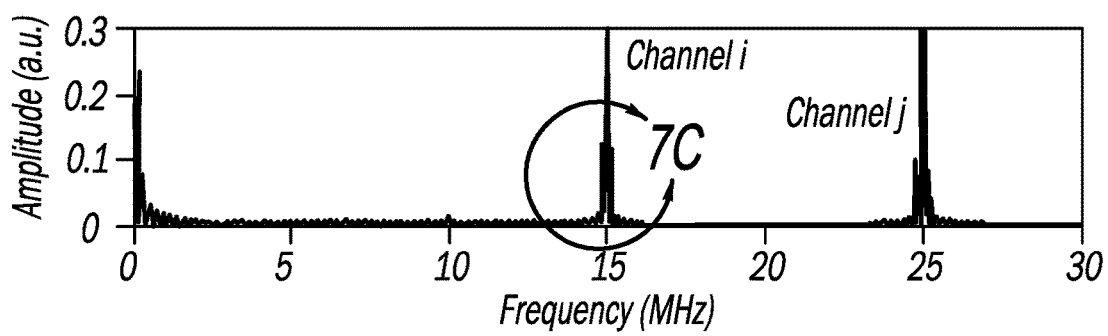
Figure 7C:
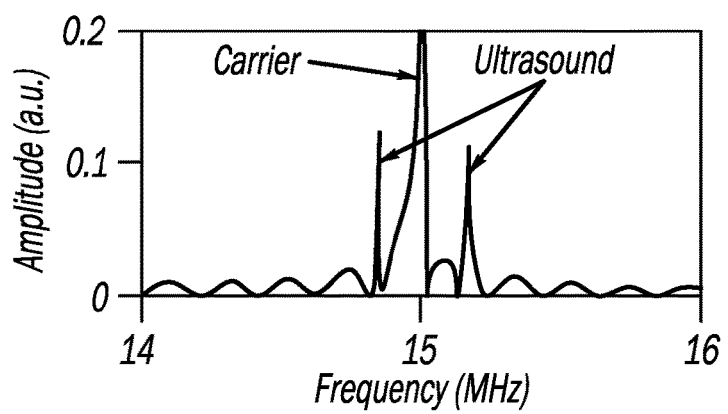
Figure 7D:
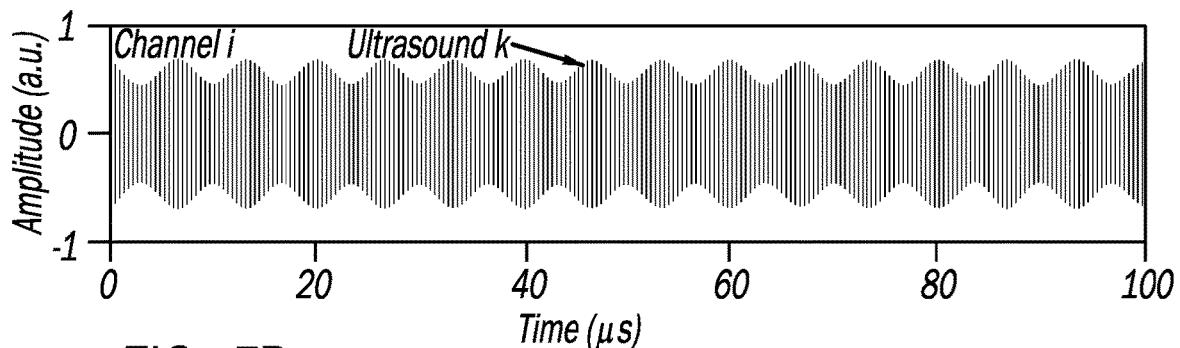
Figure 7E:
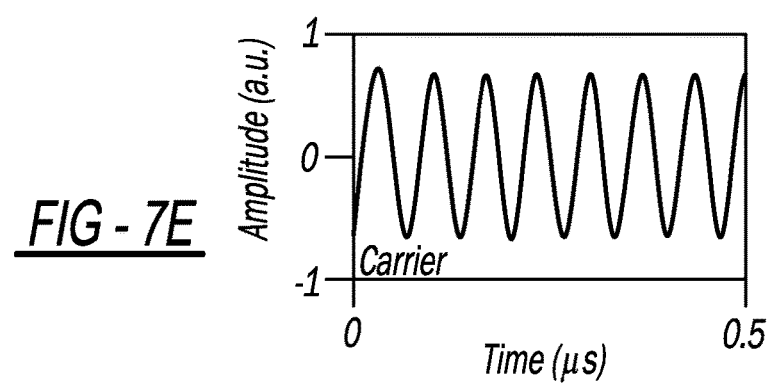
Figure 7F:
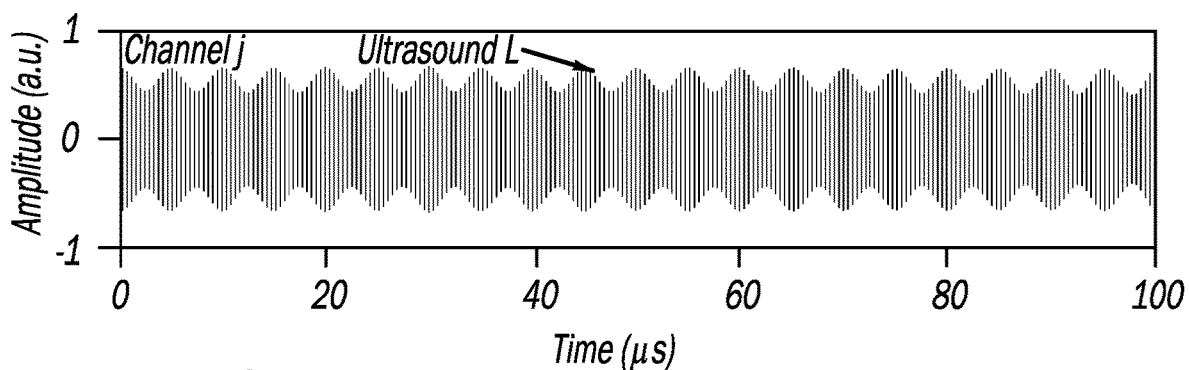
Figure 7G:
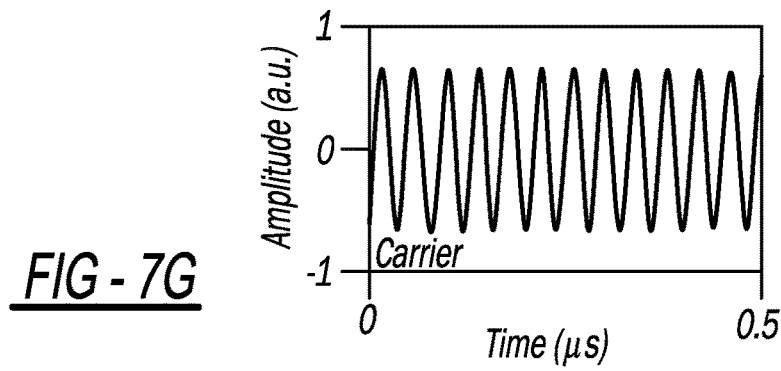

Referring now to FIGS. 6-7G, considering the two channels i and j, by way of example, assuming the IM is a Mach-Zehnder modulator, the output optical power of each channel (after the IM) can be given as $$I_m(t) = I_{m0}\{1 + \cos[\pi v_m(t) + \frac{\pi}{2}]\}, (m = i, j) \quad (1)$$

where $I_{m0}$ is the initial output power of the $m^{th}$ laser, $v_m$ is the modulation voltage normalized to the voltage causing a phase difference of π between the two arms of the Mach-Zehnder modulator. In Eq. (1), the initial phase of π/2 is chosen so that the even harmonic components vanishes after applying a sinusoidal modulation voltage of $$v_m(t) = \alpha_m \cos(2\pi f_m t), (m=i,j) \quad (2)$$

where $\alpha_m$ and $f_m$ are the amplitude and frequency, respectively.

Assuming the wavelengths of the $i^{th}$ and $j^{th}$ lasers are set to the slope of the reflection spectra of sensors k and l, respectively, which are impinged independently by ultrasounds k and l, respectively, then, the output voltage of the PD is given by $$V_{PD}(t) \propto i_i(t)[R_k + \Delta R_k \cos(2\pi f_{sk}t)] + I_j(t)[R_l + \Delta R_l \cos(2\pi f_{sl}t)]' \quad (3)$$

where $R_k$ and $R_l$ are reflectivities at the according laser wavelength, $\Delta R_k$ and $\Delta R_l$ are amplitudes of the ultrasound-induced variation of reflectivity, $f_{sk}$ and $f_{sk}$ and $f_{sl}$ are the ultrasound frequencies. Note that, for simplicity, the initial phases of the ultrasounds are ignored in Eq. (3).

Expanding Eq. (1) in terms of Bessel functions, Eq. (3) can be rewritten in the following form showing explicitly the harmonic components $$V_{PD}(t) \propto \quad (4)$$
$$I_{i0}\left\{1 - 2\sum_{n=0}^{\infty}(-1)^n J_{2n+1}(\pi a_i)\cos[(2n+1)2\pi f_i t]\right\} \times [R_k + \Delta R_k \cos(2\pi f_{sk}t)]$$
$$+ I_{j0}\left\{1 - 2\sum_{n=0}^{\infty}(-1)^n J_{2n+1}(\pi a_j)\cos[(2n+1)2\pi f_j t]\right\} \times [R_l + \Delta R_l \cos(2\pi f_{sl}t)].$$

The higher order harmonics along with the low frequency components will be removed by the band-pass filter; thus, only the carrier frequency as well as the near sidebands containing the ultrasonic signals survive for the according channel, i.e., $$V_i \propto -2I_{i0}J_1(\pi\alpha_i)\cos(2\pi f_i t)[R_k + \Delta R_k \cos(2\pi f_{sk}t)], \quad (5)$$

for the $i^{th}$ channel, and $$V_j \propto -2I_{j0}J_1(\pi\alpha_j)\cos(2\pi f_j t)[R_l + \Delta R_l \cos(2\pi f_{sl}t)], \quad (6)$$

for the $j^{th}$ channel. Equations (5) and (6) explicitly demonstrate that the ultrasonic signal becomes the amplitude modulation ("AM") envelope of the according high-frequency carrier signal.

FIG. 7A illustrates an expected real-time waveform and FIG. 7B shows an expected frequency spectrum of the total output from the two channels. The carrier signals along with their concomitant ultrasonic signals are separated in the frequency domain. As shown in FIG. 7B, using a narrow BPF centered around the carrier frequency but broad enough to cover the side lobes; the ultrasonic signal carried in this channel can be isolated from other channels. FIG. 7C shows an expected isolated frequency spectrum for channel i. FIGS. 7D and 7F show, respectively, the isolated real-time waveform of the $i^{th}$ (i.e., Eq. (5)) and $j^{th}$ (i.e., Eq. (6)) channel in the time domain, where the AM of the carrier by the ultrasonic signal is clearly seen. Thus, an envelope detector can be used to extract the ultrasonic signal. Further, FIGS. 7E and 7G exhibit an enlarged view of the carrier signal.

Figure 8:
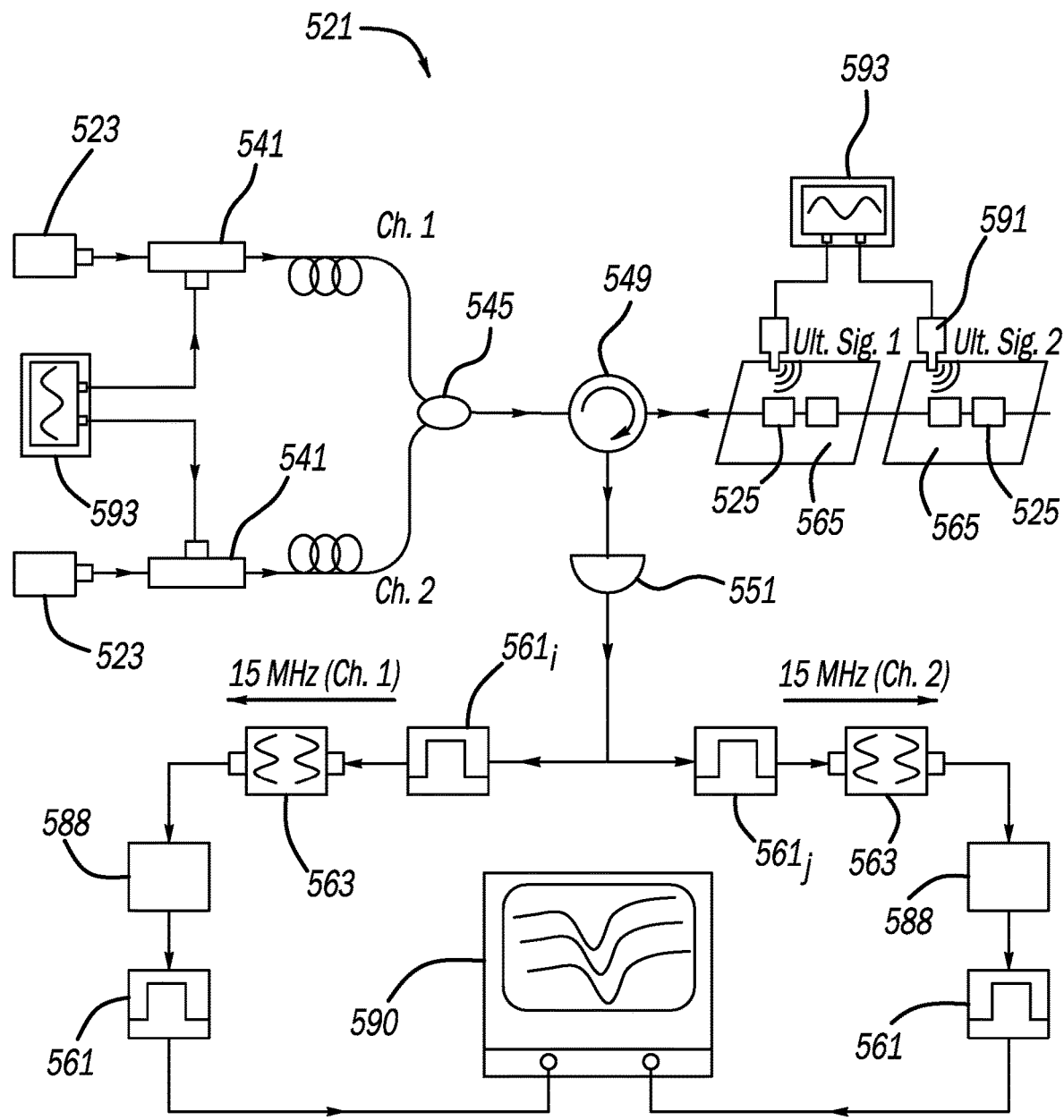
FIG. 8 is a circuit diagram showing a sixth embodiment of the present system.

More specifically with reference to the next embodiment of FIGS. 8 and 9, multiple portable lasers 523 are tunable over the C-band served as the light sources. Output power of the two lasers was modulated by IMs 541. The "rf" ports of IMs 1 and 2 were driven, respectively, by a 15 MHz and 25 MHz sinusoidal function generated from a function generator. At the same time, the "dc" ports of the two IMs were supplied with a DC voltage to make the IMs work at the quadrature point of the transmission curve. Polarization of the light going out of the IM is adjusted by a polarization controller to align with one of the principal axes of the according fiber sensor 525. The modulated optical signals from the two channels were combined via 50/50 coupler 545, which were then directed to fiber sensors 525 using circulator 549. In this experiment, the laser wavelengths of channels 1 and 2 are allocated to interrogate sensors 1 and 2, respectively. The returned optical signals are received by PD 551. Output of the PD were split into two paths. One path went through a band-pass filter 561; that only let the carrier and ultrasonic signals from channel 1 go through. The other path went through another BPF 461$_j$ that only let the carrier and ultrasonic signals from channel 2 go through. An envelope detector 563 is used to extract the ultrasonic signals for both paths. Before being displayed on an oscilloscope 590, the extracted ultrasonic signals from both channels went through a pre-amplifier 588 with 40 dB gain and another pair of BPFs with a passband of 100-300 kHz.

Figure 9A:
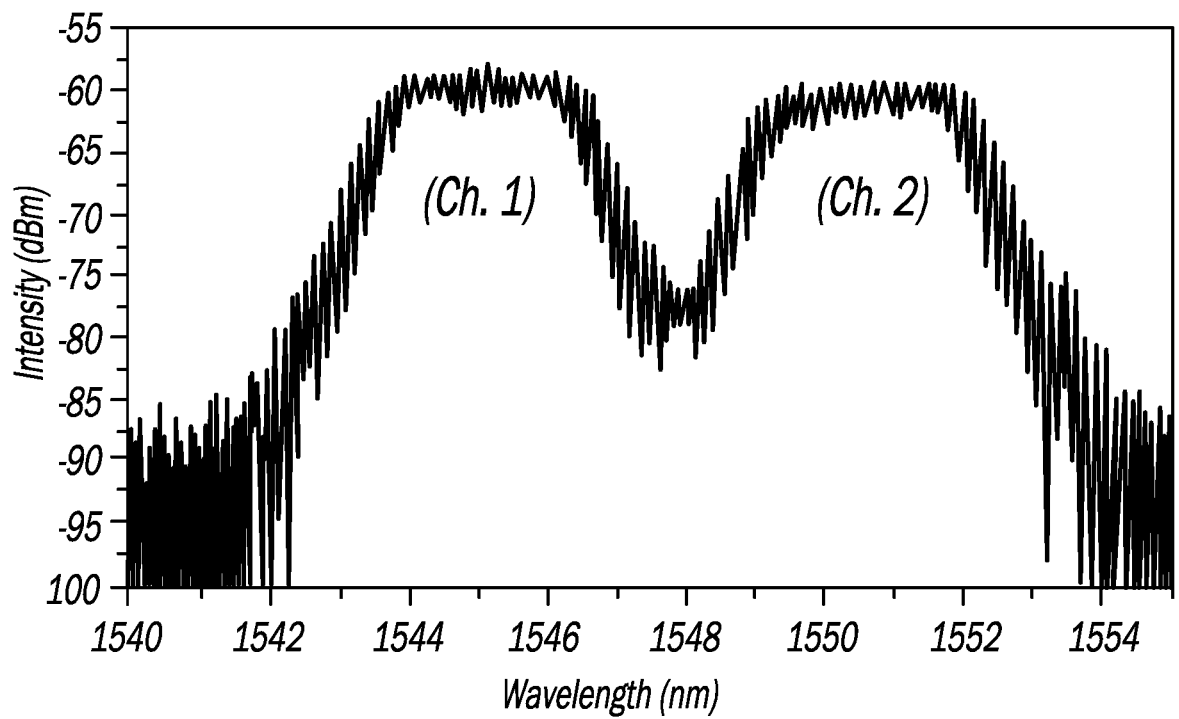
FIGS. 9A and 9B are graphs for the sixth embodiment of the present system.
Figure 9B:
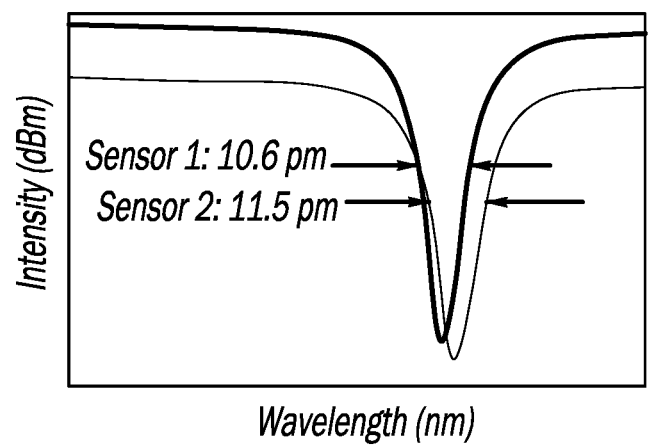

Two chirped-fiber-Bragg-grating Fabry-Perot interferometers are used as sensors 525 for ultrasound detection. Each sensor consists of two cascaded 5-mm long sensors without a spacing between each pair. Advantages of this ultrasonic sensor include adaption to large background strain while maintaining the high sensitivity. Furthermore, reflection spectra of the two sensors are shown in FIG. 9A, which suggest that sensors 1 and 2 are centered around 1545 nm and 1550.5 nm, respectively. Both sensors have an overall 3-dB optical bandwidth of around 2.8 nm and bandwidth of the resonant notches around the center wavelength is about 11 pm for both sensors as shown in FIG. 9B. The two sensors are surface-bonded on two separate aluminum plates 565, so that the ultrasonic signals could be excited separately without interplay. The ultrasonic signals are generated by two PZT transducers 591 driven by a function generator 593 outputting sinusoidal waveforms in either continuous or burst-tone mode. The driving frequency for PZT 1 (sensor 1) is 150 kHz, while the frequency for PZT 2 (sensor 2) is 200 kHz for one example.

Figure 10:
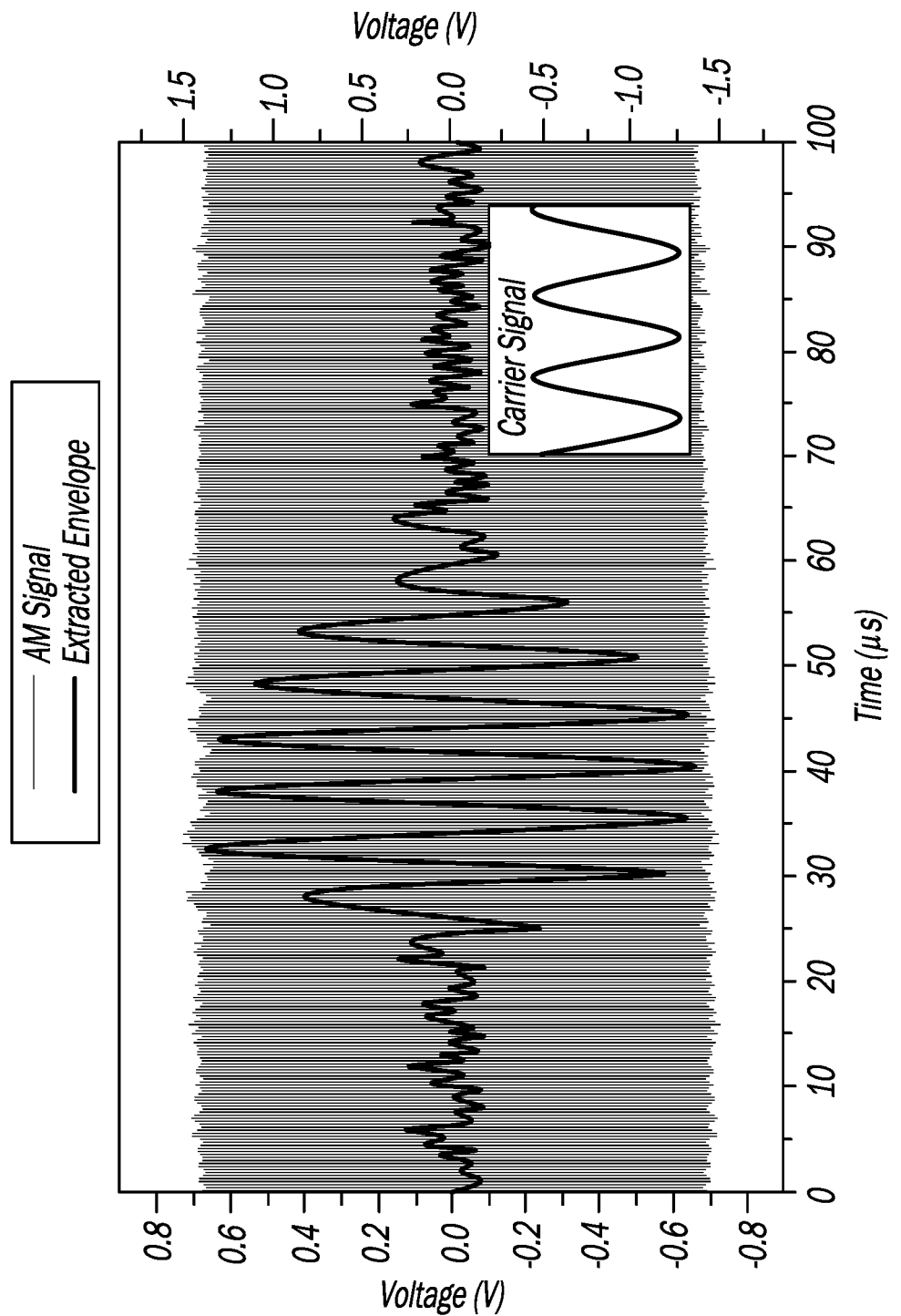
FIG. 10 is a graph for the sixth embodiment of the present system.

The expected results of an AM of the carrier signal by a tone-burst ultrasonic signal are shown in FIG. 10 where a five-cycle burst-tone mode is used to drive the PZTs and the data is collected from channel 2. The AM Envelope signal curve is the 25 MHz sinusoidal carrier signal (denoted as the carrier signal) and its AM envelope caused by the ultrasound is clearly seen. The extracted envelope ultrasonic signal is retrieved from the AM envelope by envelope detector 2.

Figure 11A:
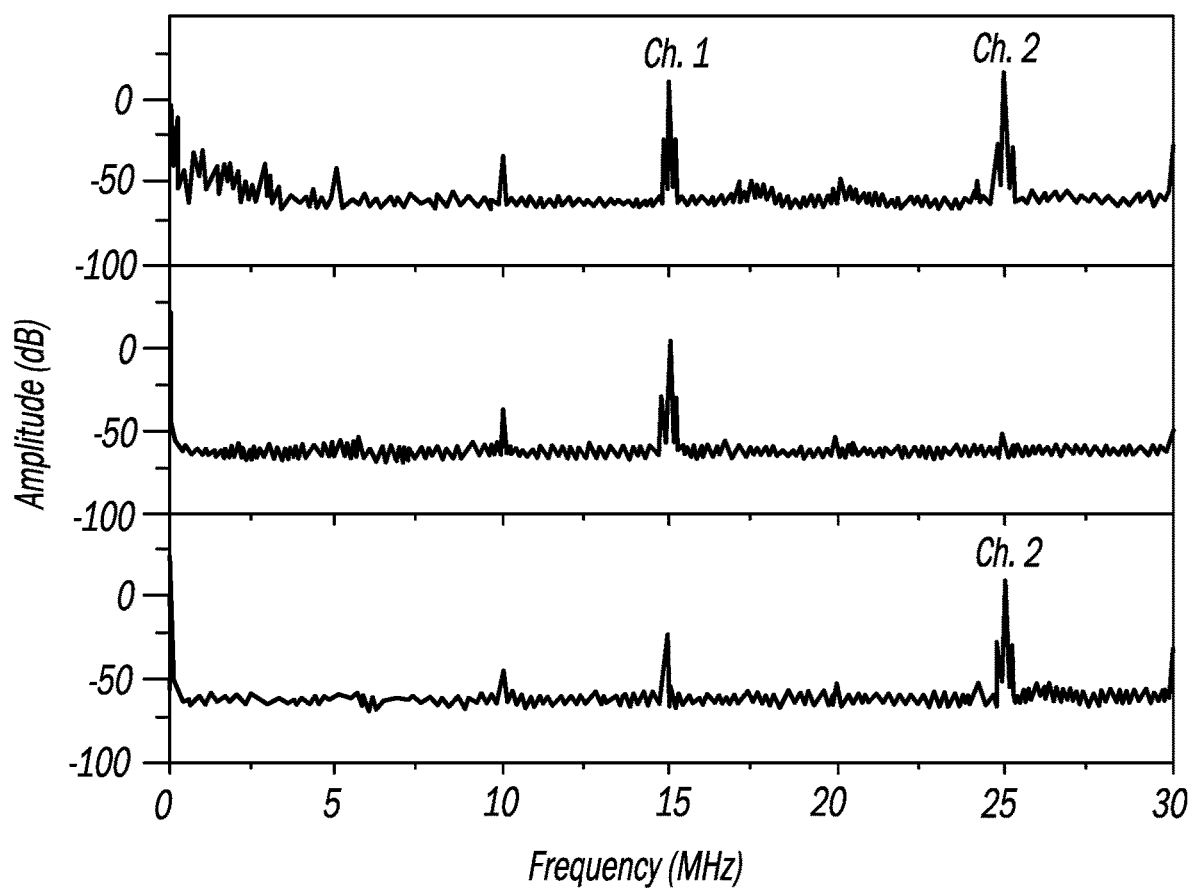
FIGS. 11A and 11B are graphs for the sixth embodiment of the present system.
Figure 11B:
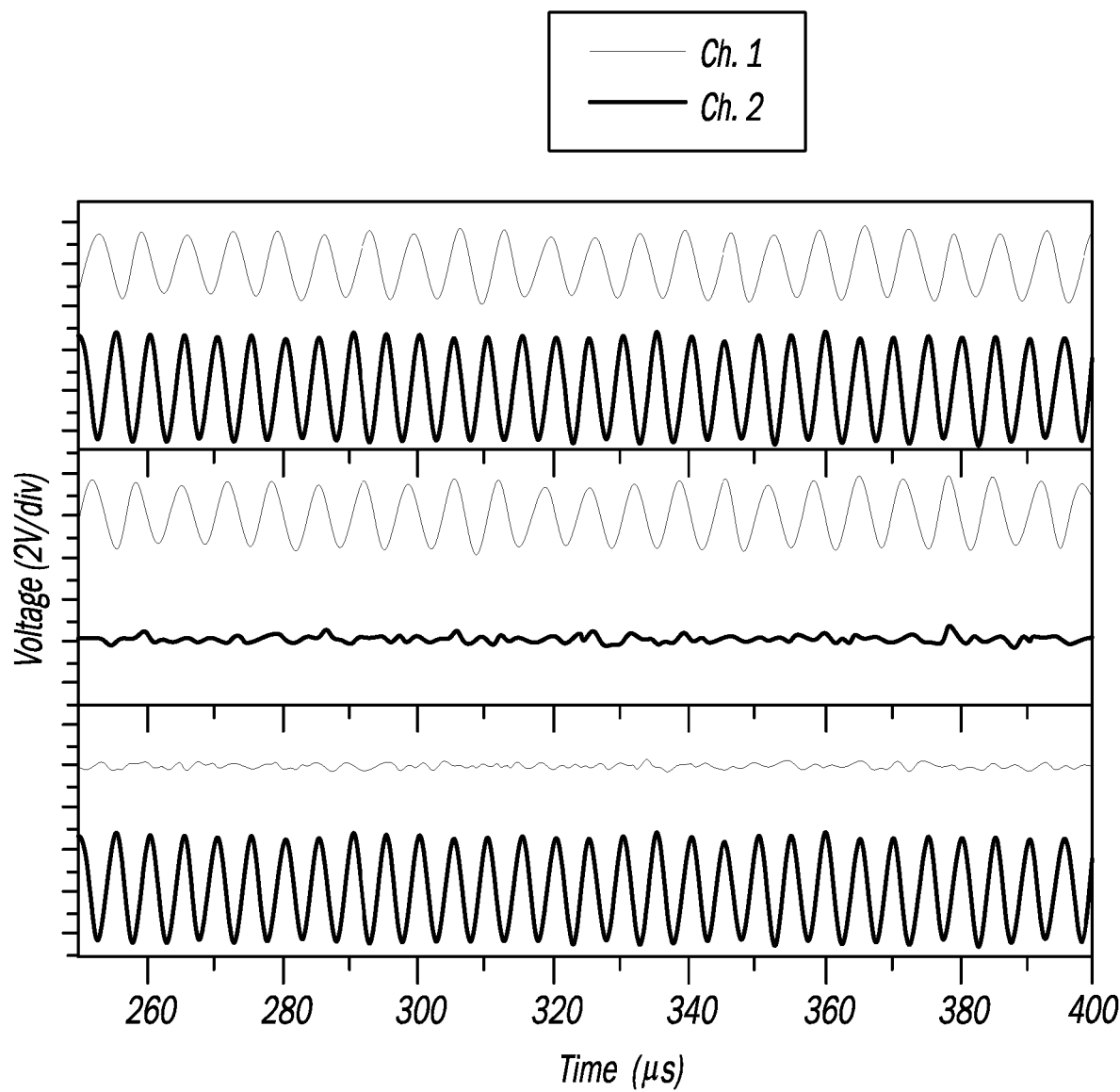

FIGS. 11A and 11B illustrate expected results of the sixth embodiment of the system regarding cross-talk of the two multiplexed channels. In this case, continuous mode is used for ultrasound generation. The frequency spectra are first examined in the top panel of FIG. 11A which displays the spectrum of the original signal, i.e., the direct output of the PD. The middle panel shows the spectrum of the filtered signal after the BPF 1, i.e., channel 1. It can be seen clearly that the carrier signal and ultrasound signal from channel 2 are well suppressed and the residual signals below 5 MHz are effectively removed as well. The suppression of both the signals from the other channel and the residual signals at low frequency guarantees the absence of cross-talk between the two channels. Moreover, the bottom panel exhibits the spectrum of the filtered signal after the BPF 2. Similarly, the signals from channel 1 and the low frequency range are greatly suppressed. Note that the residual carrier signal from channel 1 in the bottom panel is stronger than the residual carrier signal from channel 2 in the middle panel, which is believed to originate from the different properties of the BPF 1 and BPF 2. However, because the ultrasonic signal resides in the sidebands which are much weaker than the carrier signal, the residual ultrasound-signal-free carrier signal from channel 1 does not bring about cross-talk. These are verified by FIG. 11B, of which the top panel shows the output when both ultrasonic signals are excited, and the middle and bottom panels show the output when only one ultrasonic signal is present. Accordingly, there is not visible cross-talk between the two channels.

In summary, the present multiplexed fiber-optic ultrasound sensing network modulates the laser intensity with a sinusoidal carrier signal whose frequency is much higher than that of the ultrasound under detection, and the ultrasonic signal appears as the sidebands of the according carrier signal in the frequency domain. Using a carrier signal with a different frequency for different channels, the channels are separated in the frequency domain. Using a narrow BPF, the carrier signal along with the concomitant ultrasonic signal is isolated from the other channels. An envelope detector is then used to extract the ultrasonic signal from the carrier signal for each channel. Advantageously, a two-channel system exhibits no cross-talk between the two channels.

Figure 12:
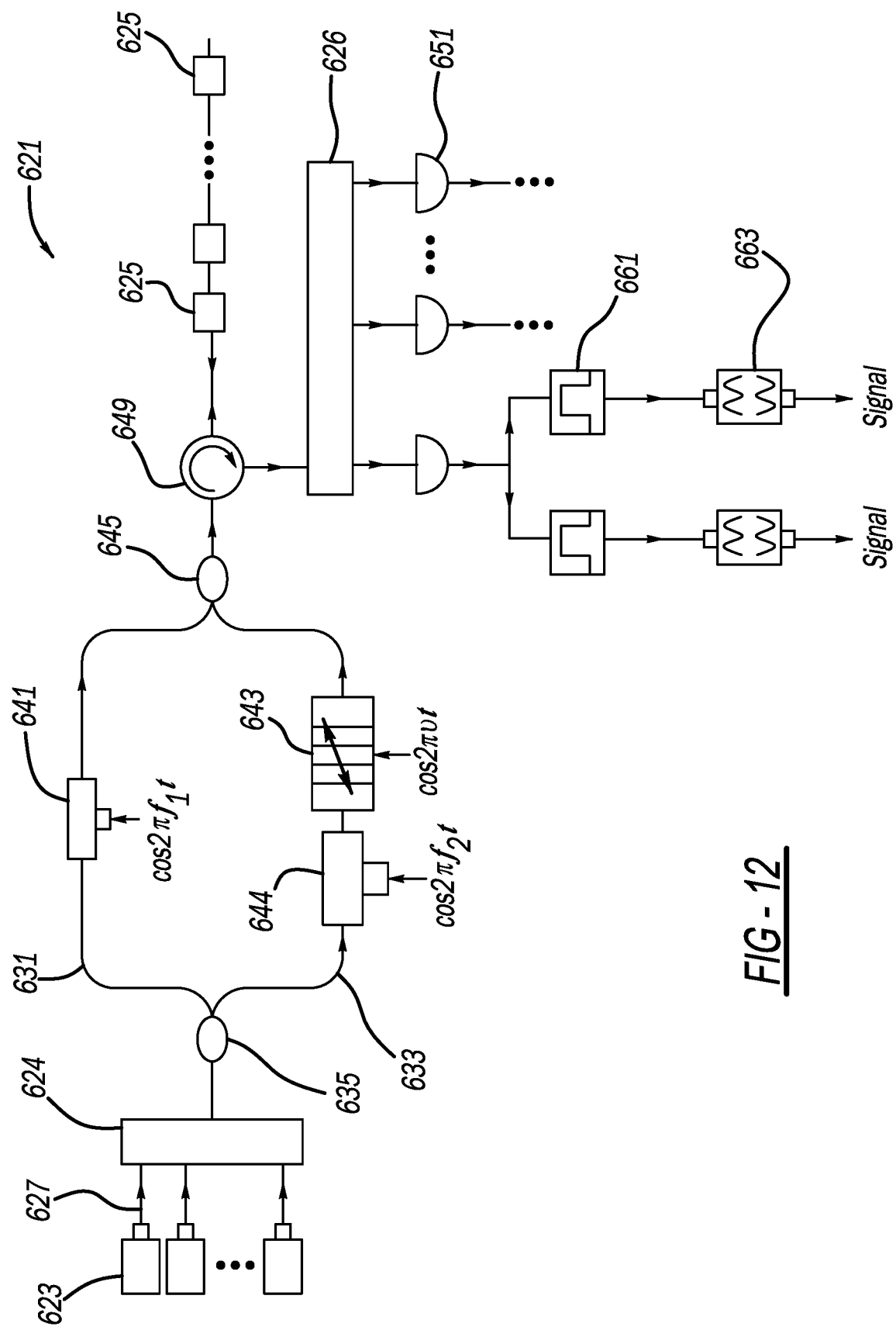
FIG. 12 is a circuit diagram showing a seventh embodiment of the present system.

FIG. 12 illustrates a seventh embodiment of the present demodulation system. A set of single frequency lasers 623 emit laser beam light through optical fibers 627 directly to a wavelength division multiplexer 624. This multiplexed light is split into upper and lower optical paths or arms 631 and 633, respectively, by a coupler 635. An IM 641 is associated with the upper path while an IM 644 and a frequency shifter 643 are associated with the lower path. These modulated light signals are then transmitted along the parallel fibers which are subsequently joined together again at a coupler 645 and sent on to a set of interferometric sensors 625. Sensors 625 are designed in such a way that the original laser line and the frequency-shifted laser line are at quadrature points of the fringes of the sensors. Subsequently, a circulator 649 directs the reflected light signals to a wavelength division demultiplexer 626 for combining the light, and multiple parallel fiber paths, each associated with a PD 651 and then branched arms each including a BPF 661 and ED 663. Of note, this configuration beneficially demodulates multiple sensor light signals using a single frequency shifter.

While various embodiments of the present invention have been disclosed, it should also be appreciated that other variations may be employed. For example, additional or alternate optical components may be included in the present system; however, many of the performance advantages may not be achieved. It is alternately envisioned that alternate lasers or modulator may be utilized, although some of the preferred advantages may not be realized. It should also be appreciated that any of the preceding embodiments and features thereof can be mixed and matched with any of the others in any combination depending upon the final product and processing characteristics desired. Variations are not to be regarded as a departure from the present disclosure, and all such modifications are intended to be included within the scope and spirit of the present invention.

The invention claimed is:

1. A demodulation system comprising:
a single frequency laser emitting a laser beam into an optical fiber;
a fiber-optic split coupler dividing the laser beam into a first beam in a first arm and a second beam in a second arm;
a first intensity modulator modulating the intensity of the laser beam in the first arm at a first modulation frequency to form a first laser beam portion;
a second intensity modulator modulating the intensity of the laser beam in the second arm at a second modulation frequency different than the first frequency;
a frequency shifter shifting the frequency of the laser beam in the second arm to form a second laser beam portion;
a coupler coupling the first laser beam portion and the second laser beam portion;
an interferometric sensor reflecting the first laser beam portion as a first line of light and the second laser beam portion as a second line of light, wherein a difference of the first line of light and the second line of light corresponds to a phase difference of $(m+1/4)\pi$, where m is an integer, of spectral fringes of the sensor so that the first line and second line are at different quadrature points of fringes;
a photodetector receiving light reflected from the sensor; and
an envelope detector detecting variations in reflected power in the first laser line and the second laser line which are at the quadrature positions of the spectral fringes, such that the interferometric sensor provides a sensitive response to a spectral shift.

2. The system of claim 1, wherein the laser generates multiple quadratic wavelengths to demodulate the interferometric sensor with sinusoidal fringes.

3. The system of claim 1, wherein the laser beam is split into multiple paths, with the light in the paths being modulated at different frequencies, whereafter the paths are recombined into another fiber which leads to the interferometric sensor.

4. The system of claim 1, further comprising at least one electric filter and at least one envelop detector, two laser beam wavelengths being separated and signals from two quadrature channels being obtained through intensity modulation of one or both channels, with assistance of an electronic filter and the envelop detector.

5. The system of claim 1, further comprising multiple laser beam channels being separated using an at least three-port AOM and time-division multiplexing/demultiplexing.

6. The system of claim 1, wherein the interferometric sensor is part of a multiplexed sensor system where only one frequency shifter is shared by multiples of the interferometric sensor.

7. The system of claim 1, further comprising:
a workpiece to which the interferometric sensor is attached;
the interferometric sensor providing accurate ultrasound detection even when a spectrum of the interferometric sensor experiences large environmental drifts including temperature variations in the workpiece.

8. The system of claim 1, further comprising:
a workpiece to which the interferometric sensor is attached, the workpiece being one of: an aircraft wing component, an infrastructure bridge, a power transmission structure, or a pipeline;
the interferometric sensor sensing ultrasonic acoustic signals to determine if any cracks or other undesirable structural characteristics are present in the workpiece adjacent to the interferometric sensor.

9. The system of claim 1, wherein:
the interferometric sensor is a two-beam fiber Mach-Zehnder interferometer including multiple optical paths, a first of the paths being a signal arm and a second of the paths being a reference arm;
light from the laser beam is amplitude-divided by a first fiber coupler into two laser beams propagating in the arms;
the signal arm senses disturbances in an external environment and the reference arm is maintained in a relatively constant environment;
an optical phase is changed by disturbances when the laser beam travels through the signal arm, thereby producing a phase difference between the two split beams, which are thereafter recombined by a second fiber coupler; and
output beams are then detected by multiples of the photodetector, and converted into a fringe signals in antiphase.

10. The system of claim 1, wherein:
the interferometric sensor is a fiber Michelson interferometer, wherein signal and reference paths are terminated by Faraday mirrors; and
a signal laser beam and a reference laser beam are reflected by the associated mirrors back to a coupler where they are recombined to generate an interference signal.

11. The system of claim 1, wherein:
the interferometric sensor is a fiber Sagnac interferometer including a two-beam, common-path interferometer in which two laser beams from at least one coupler pass along the same fiber loop but in opposite directions;
an interference fringe is generated when the opposite beams recombine at the at least one coupler; and
the interferometric sensor is configured to sense at least one of: electrical current, voltage, an electric field or a magnetic field.

12. The system of claim 1, wherein:
the interferometric sensor is a Fabry-Perot interferometer including an interferometric cavity formed by multiple parallel reflectors or partial mirrors, on either side of an optically transparent medium; and
an interference fringe, caused by multiple reflections of the laser beam in the cavity.

13. The system of claim 1, further comprising a polarization controller configured to adjust polarization of light of the laser beam leaving the modulator.

14. A demodulation system comprising:
a laser coupled to a first optical fiber;
multiple arms splitting from the optical fiber;
an optical frequency shifter connected to at least one of the arms configured to generate different laser wavelengths at quadrature positions of interferometric fringes;
an interferometric sensor receiving a combination of a frequency-shifted laser beam from the shifter and an unshifted laser beam wherein a difference of the frequency shifted laser beam and the unshifted laser beam corresponds to phase difference of $(m+1/4)\pi$, where m is an integer, of spectral fringes of the sensor so that frequency shifted laser beam and the unshifted laser beam are at different quadrature points of fringes; and
a photodetector receiving light from the sensor.

15. The system of claim 14, further comprising:
at least one electronic filter located downstream of the photodetector;
at least one envelope detector connected to the electronic filter; and
the shifter including at least one of: an intensity modulator or an acousto-optic modulator.

16. The system of claim 14, further comprising:
a fiber optic coupler;
the two arms including an intensity modulator connected in one of the arms and a an acousto-optic modulator connected in a second of the arms;
at least a second optical fiber;
the arms being recombined into the second optical fiber which leads to the interferometric sensor; and
laser light sent to the interferometric sensor including multiple laser lines whose difference is equal to an amount of frequency shift.

17. The system of claim 14, wherein light from the laser is split into the arms, with the light in the arms being modulated at different frequencies, whereafter the paths are recombined into another fiber which leads to the interferometric sensor.

18. The system of claim 14, wherein the arms are separated using the shifter which includes an at least three-port AOM and time-division multiplexing/demultiplexing.

19. The system of claim 14, further comprising:
a workpiece to which the interferometric sensor is attached, the workpiece being one of: an aircraft wing component, an infrastructure bridge, a power transmission structure, or a pipeline;
the interferometric sensor sensing ultrasonic acoustic signals to determine if any cracks or other undesirable structural characteristics are present in the workpiece adjacent to the interferometric sensor.

20. A demodulation system comprising:
a single frequency laser emitting a laser beam into an optical fiber;
a fiber-optic split coupler dividing the laser beam into a first beam in a first arm and a second beam in a second arm;
a first intensity modulator modulating the intensity of the laser beam in the first arm at a first modulation frequency to form a first laser beam portion;
a second intensity modulator modulating the intensity of the laser beam in the second arm at a second modulation frequency different than the first frequency;
a frequency shifter shifting the frequency of the laser beam in the second arm to form a second laser beam portion;
a coupler coupling the first laser beam portion and the second laser beam portion; an interferometric sensor configured to receive the modulated laser beam light from the at least second optical fiber, the modulated laser beam light sent to the interferometric sensor including two laser lines whose difference corresponds to a phase difference of $(m+1/4)\pi$, where m is an integer, of spectral fringes of the sensor so that the first line and second line are at different quadrature points, such that the interferometric sensor is configured to provide a response to a spectral shift therein due to ultrasonic acoustic signals;
a photodetector configured to receiving light from the sensor;
at least one electronic filter coupled to the photodetector; and
at least one envelope detector coupled to the filter.

21. The system of claim 20, further comprising:
a workpiece to which the interferometric sensor is attached, the workpiece being one of: an aircraft wing component, an infrastructure bridge, a power transmission structure, or a pipeline;

the interferometric sensor sensing the ultrasonic acoustic signals to determine if any cracks or other undesirable structural characteristics are present in the workpiece adjacent to the interferometric sensor.

22. The system of claim 20, wherein the different laser beam light wavelengths are separated and signals from quadrature channels are obtained through intensity modulation of one or multiple channels, with assistance of electronic filter and the envelop detector.

23. The system of claim 20, further comprising multiple laser beam channels being separated using the acousto-optic modulator, which is a three-port AOM with time-division multiplexing/demultiplexing.

24. The system of claim 20, wherein the interferometric sensor is part of a multiplexed sensor system where only one frequency shifter is shared by multiples of the interferometric sensor.

* * * * *